United States Patent
Arning et al.

(10) Patent No.: US 8,290,799 B2
(45) Date of Patent: Oct. 16, 2012

(54) SYSTEM AND METHOD FOR BUILDING KNOWLEDGEBASE FOR SOFTWARE SYSTEM

(75) Inventors: Andreas Arning, Tuebingen (DE); Hans-Peter Reimann, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/340,931

(22) Filed: Dec. 22, 2008

(65) Prior Publication Data

US 2010/0161389 A1    Jun. 24, 2010

(51) Int. Cl.
*G06Q 30/00* (2006.01)
(52) U.S. Cl. ......... 705/7; 705/8; 705/9; 705/10; 705/26; 705/27; 705/35
(58) Field of Classification Search ............... 705/7, 10, 705/27, 8, 9, 26, 35
See application file for complete search history.

(56) References Cited

U.S. PATENT DOCUMENTS

| | | | |
|---|---|---|---|
| 2004/0006566 A1* | 1/2004 | Taylor et al. | 707/100 |
| 2008/0040299 A1* | 2/2008 | Faihe | 706/14 |
| 2010/0223157 A1* | 9/2010 | Kalsi | 705/27 |

* cited by examiner

*Primary Examiner* — Nga B. Nguyen
(74) *Attorney, Agent, or Firm* — Thomas E. Lees, LLC

(57) ABSTRACT

A system and associated method for building a knowledgebase for a software system. The knowledgebase has multiple problem-solution records for problems that may occur in the software system. A user of the knowledgebase requests a solution to a problem by submitting a problem description and payment information. The payment information is separately verified and the knowledgebase is searched for a problem-solution record that has the same problem description provided by the user. A solution of the matched problem-solution record is presented to the user and the user provides a feedback rating how effective the solution is in solving the problem. The feedback may be another solution for the problem or evidences supporting the feedback. If the feedback is evaluated to be valuable, the knowledgebase may be updated with the feedback. An author of an existing valuable solution and/or the user who provided another solution is rewarded.

20 Claims, 3 Drawing Sheets

SYSTEM AND METHOD FOR BUILDING KNOWLEDGEBASE FOR SOFTWARE SYSTEM

FIELD OF THE INVENTION

The present invention discloses a system and associated method for building an effective knowledgebase for solving and preventing problems in a software system and thereby prevents fraudulent uses.

BACKGROUND OF THE INVENTION

Conventional methods for solving and preventing software problems incur significant amount of cost to solve each problem separately because even an existing solution for a recurring and/or predictable problem is not effectively shared among users of a software system. Although solutions for respective known problems can be gathered to be reused in a knowledgebase for the software system, conventional methods for building a knowledgebase for a software system lack incentives to motivate users of the software system to report and to contribute problems and associated solutions. Conventional methods for building a knowledgebase do not provide ways to assure the quality of the solution in the knowledgebase.

Thus, there is a need for a system and associated method that overcomes at least one of the preceding disadvantages of current methods and systems for building a knowledgebase for a software system.

SUMMARY OF THE INVENTION

The present invention provides a method for building a knowledgebase for a software system, the method comprising:

receiving a request comprising a problem description and payment information from a user of a computer system that is coupled to the knowledgebase;

verifying the payment information against payment database by a payment verification server that is coupled to the computer system;

finding, in the knowledgebase, a first record comprising a first problem description that matches the problem description of the request, wherein the first record further comprises at least one solution associated with the first problem description;

sending the first record found in the knowledgebase to an output device of the computer system;

receiving a feedback on the first record from the user, wherein said feedback comprises rate information of the first record indicating how the user values each solution of said at least one solution of the first record in solving the problem;

evaluating the received feedback;

calculating a reward based on the feedback for an author of said at least one solution; and paying the calculated reward to the author of said at least one solution, wherein said receiving the request, said verifying, said finding, said sending, said receiving the feedback, said evaluating, said calculating, and said paying are performed by the computer system.

The present invention provides a computer program product, comprising a computer usable storage medium having a computer readable program code embodied therein, said computer readable program code containing instructions that when executed by a processor of a computer system implement a method for building a knowledgebase for a software system, the method comprising:

receiving a request comprising a problem description and payment information from a user of a computer system that is coupled to the knowledgebase;

verifying the payment information against payment database by a payment verification server that is coupled to the computer system;

finding, in the knowledgebase, a first record comprising a first problem description that matches the problem description of the request, wherein the first record further comprises at least one solution associated with the first problem description;

sending the first record found in the knowledgebase to an output device of the computer system;

receiving a feedback on the first record from the user, wherein said feedback comprises rate information of the first record indicating how the user values each solution of said at least one solution of the first record in solving the problem;

evaluating the received feedback;

calculating a reward based on the feedback for an author of said at least one solution; and paying the calculated reward to the author of said at least one solution, wherein said receiving the request, said verifying, said finding, said sending, said receiving the feedback, said evaluating, said calculating, and said paying are performed by the computer system.

The present invention provides a computer system comprising a processor and a computer readable memory unit coupled to the processor, said memory unit containing instructions that when executed by the processor implement a method for building a knowledgebase for a software system, the method comprising:

receiving a request comprising a problem description and payment information from a user of a computer system that is coupled to the knowledgebase;

verifying the payment information against payment database by a payment verification server that is coupled to the computer system;

finding, in the knowledgebase, a first record comprising a first problem description that matches the problem description of the request, wherein the first record further comprises at least one solution associated with the first problem description;

sending the first record found in the knowledgebase to an output device of the computer system;

receiving a feedback on the first record from the user, wherein said feedback comprises rate information of the first record indicating how the user values each solution of said at least one solution of the first record in solving the problem;

evaluating the received feedback;

calculating a reward based on the feedback for an author of said at least one solution; and paying the calculated reward to the author of said at least one solution, wherein said receiving the request, said verifying, said finding, said sending, said receiving the feedback, said evaluating, said calculating, and said paying are performed by the computer system, wherein the knowledgebase comprises at least one record, wherein each record of said at least one record comprises a respective problem description and a respective solution, wherein the respective problem description is a searchable index of each record in the knowledgebase, and wherein the respective solution describes how to solve or prevent a software problem specified in the respective problem description.

The present invention provides a method and system that overcomes at least one of the current disadvantages of conventional method and system for building a knowledgebase of solutions for problems in a software system.

DETAILED DESCRIPTION OF THE INVENTION

Figure 1:
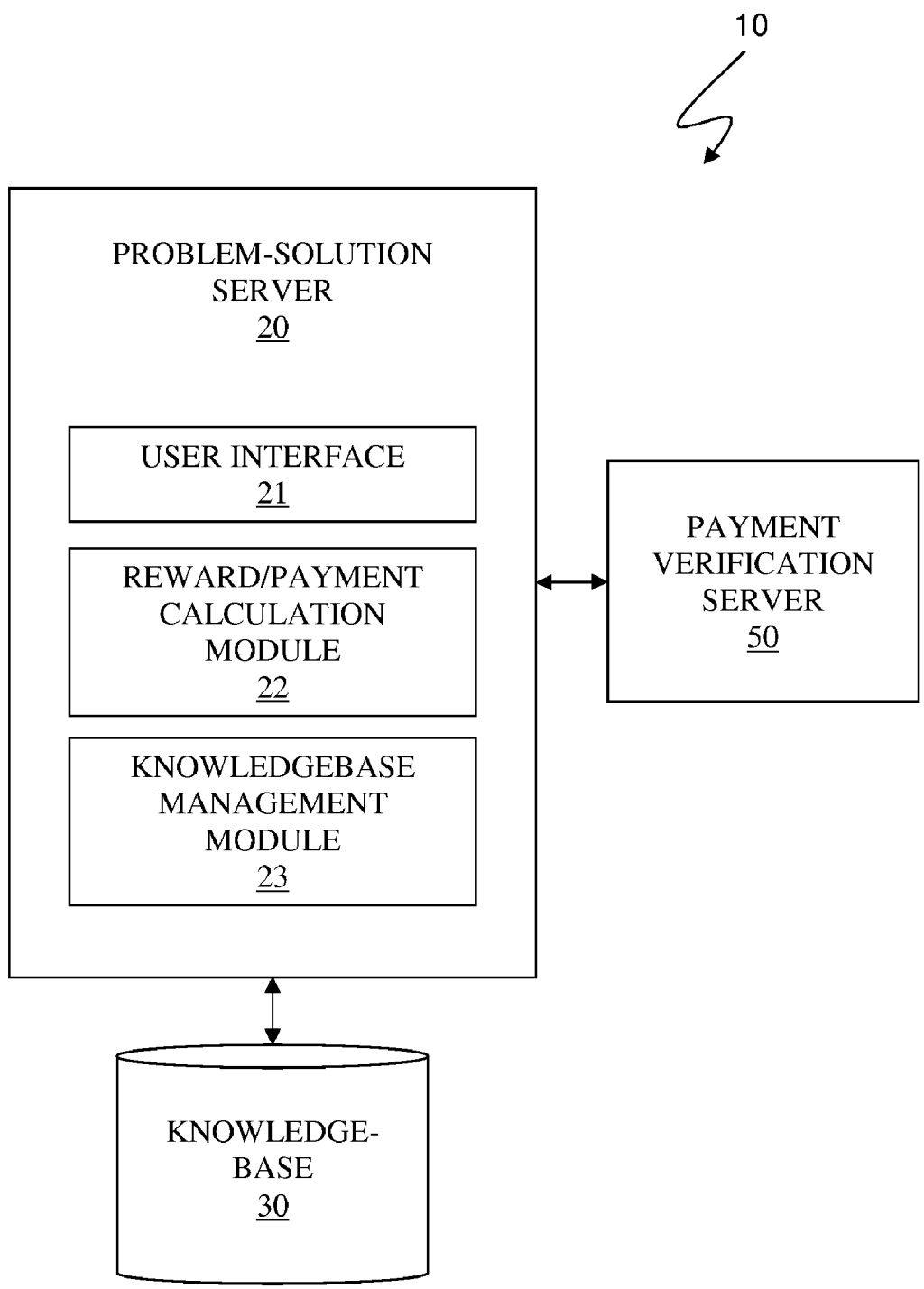
FIG. 1 illustrates a system for building a knowledgebase of solutions for problems in a software system, in accordance with embodiments of the present invention.

FIG. 1 illustrates a system 10 for building a knowledgebase of solutions for problems in a software system, in accordance with embodiments of the present invention.

The system 10 comprises a problem-solution server 20, a knowledgebase 30, and a payment verification server 50.

The problem-solution server 20 comprises a user interface module 21, a reward/payment calculation module 22, and a knowledgebase management module 23.

The user interface module 21 facilitates users to interactively provide data to the problem-solution server 20. Data from users comprises problem descriptions, payment information, rating for a solution found in the knowledgebase, assessment of the solution found in the knowledgebase, and an alternative solution provided by a user.

The reward/payment calculation module 22 handles payment information provided by the user. The reward/payment calculation module 22 sends the payment information to the payment verification server 50 and proceeds responsive to verified payment information. The reward/payment calculation module 22 also provides reward to authors who had provided solutions that are rated as useful by users.

The knowledgebase management module 23 communicates with knowledgebase 30 to find a solution corresponding to a problem description that is input by the user against a set of problem descriptions stored in the knowledge base 30.

The knowledgebase 30 comprises at least one problem-solution tuple that is a set of solutions associated with a problem description. Each problem-solution data is searchable by a problem description of a respective problem-solution tuple. The knowledgebase 30 may be built and/or operated by a vendor of the software system as a customer service and/or a technical support, a user community, forum, and/or user group by users of the software system, independent consultants, a third-party maintenance company, etc. For the knowledgebase 30 of the software system to be effective, extensive number of problem-solution tuples that provide various problems and associated solutions for each problems acquired during the operation of the software system are necessary. Data describing a problem-solution tuple may be provided by users of the software system. The method of the present invention motivates users of the software system to report problems and contribute solutions such that the knowledgebase 30 is built effectively.

A problem description of said at least one problem-solution tuple may be, inter alia, a malfunction due to configuration errors, symptoms of programming errors, usage errors, and error messages provided by a software system, etc. A solution of said at least one problem-solution tuple that corresponds to the problem description may be, inter alia, details on how to solve the problem, details on how to work around the problem to prevent the problem from occurring, details on how to apply a particular fix to a software system for a specific error, a hint that enables the user to solve the problem, etc. In another embodiment, the solution may be associated with a timeout value such that the solution expires after a certain period of time defined in the timeout value to keep obsolete solutions out of the knowledgebase.

Figure 2:
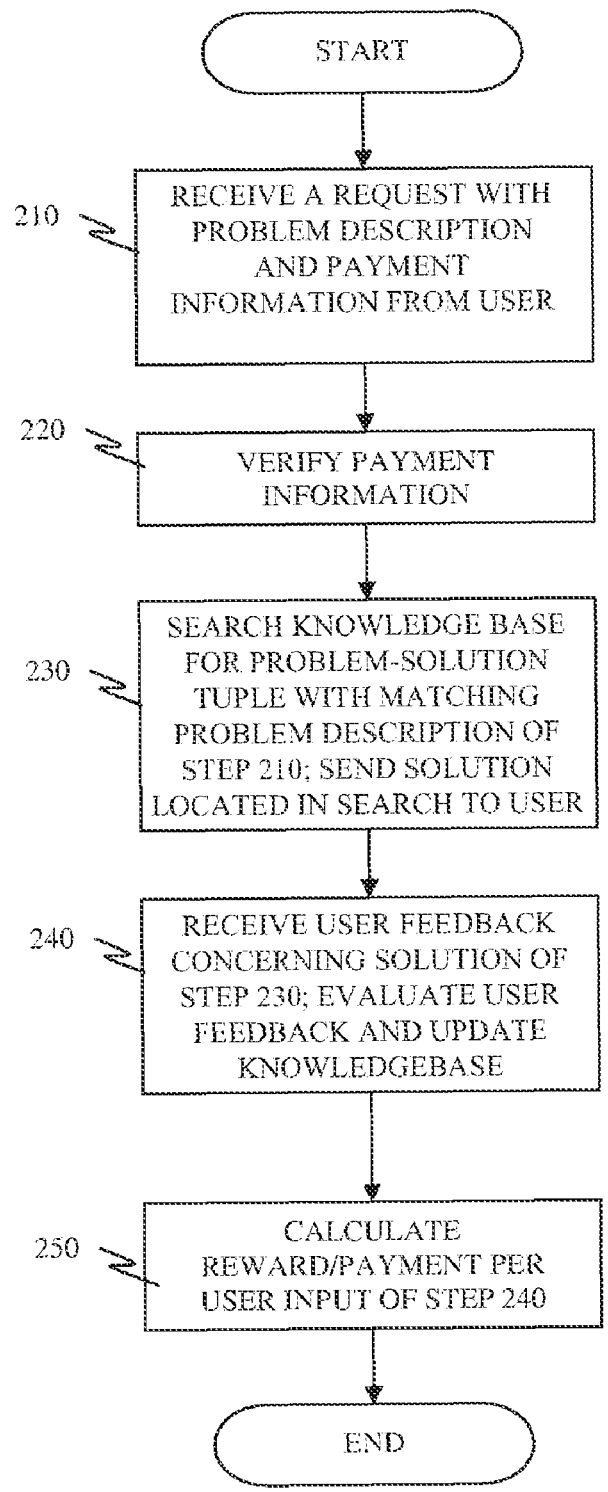
FIG. 2 is a flowchart depicting a method for building a knowledgebase of solutions for problems in a software system, in accordance with the embodiments of the present invention.

FIG. 2 is a flowchart depicting a method for building a knowledgebase of solutions for problems in a software system, in accordance with the embodiments of the present invention.

Steps 210, 220, 230, 240, and 250 are performed by a respective functional module of the problem-solution server that is referred to as a server hereinafter.

In step 210 the server receives a help request comprising a problem description and payment information from a user. The help request is to find a solution associated with the problem description. The payment information describes details of a payment made by the user to search the solution through the server.

The problem description may be, inter alia, a machine-generated error description, etc. An example for a machine-generated error description may be, inter alia, a "fingerprint" for an unexpected problem such as a Java® stack trace in Java-based software systems, a core dump in UNIX®, an error message identifier and an associated return code in DB2®, an error message identifiers in any software system, etc. (Java is a registered trademark of Sun Microsystems, Inc., in the United States and other countries; UNIX is a registered trademark of the Open Group in the United States and other countries; DB2 is a registered trademark of the International Business Machines (IBM) Corporations in the United States and other countries).

The payment information may be, inter alia, a credit card number and the amount, etc. The payment information is used to purchase the solution. The payment may be intermediated by the payment verification server or other trusted third party to secure the payment. The amount of payment may be constant per request or may vary based on several factors such as, inter alia, a nature of the problem, the content and/or effectiveness of the existing solution associated with the problem, whether or not a solution exists for the problem described in the request, etc.

In one embodiment of the present invention, the user checks the content of the knowledgebase with a prescreening query at no cost prior to submit a new problem-solution tuple such that discouraging users from providing a duplicate solution for a same problem to the knowledgebase. The knowledgebase does not provide the user details of the solutions matching the prescreening query but only informs the user whether a solution for the new problem-solution tuple exists. Thus the prescreening query prevents fraudulent user operations that are intended to save the amount of the payment information while looking up the knowledgebase.

In step 220 the server verifies the payment information by querying the payment verification server with the payment information. If the payment information is not valid, the server does not process the problem description any further.

In step 230 the server looks up a solution associated with the problem description in the knowledgebase. To present the solution to the user, the server puts the solution in a ranked list comprising zero or more solution found in the knowledgebase. Ranking may factor in, inter alia, how well the problem description submitted by user matches the problem description of each solution found in the knowledgebase, ratings previously provided by other users, etc. The server may further process the ranked list for qualifying the user or for evaluating each solution such that the server filters out dummy solutions, destructive solutions, or otherwise disqualified solutions from the knowledgebase.

In step 240 the server receives a user feedback that evaluates the solution of step 230. Each solution in the ranked list can be separately evaluated to indicate the level of contribution of a respective solution in solving the problem. The user feedback comprises rating information for the solution found in the knowledgebase. The server uses the rating information for the purpose of, inter alia, to calculate a share of the payment that will be awarded for an author of the solution, to mark a score indicating how effective each solution is for the problem, etc.

In one embodiment of the present invention, the rating information with a negative evaluation must be supported by a ground for the rating information, or may also require the user to provide a detailed result of applying the solution for public review, or even may be reported to the author of the solution for further investigation as to the effectiveness of the solution and validity of the rating information and supporting materials. The embodiment is implemented to secure the quality of solutions in the knowledgebase and to prevent any misuse of the payment/reward mechanism of the present invention.

The user feedback may further comprise an alternative solution for the problem description. In updating content of the knowledgebase, the server may check features of the alternative solution to prevent registering a duplicate solution for a same problem. If the alternative solution provided by the user shares certain features of a solution already existing in the knowledgebase, the server may not register the alternative solution for the problem, or notify the author/author group of the solution in the knowledgebase to evaluate the alternative solution provided by the user, or simply add the alternative solution as an appendix to the existing solution in the knowledgebase.

In one embodiment of the present invention, the alternative solution in the user feedback may be evaluated by a group of users who are authorized as evaluators other than the author/author group of the existing solution.

In step 250 the server calculates a reward/payment for the user input of step 240 based on content of the user feedback. If the rating information for the solution is justifiably low indicating that the solution did not help the user in solving the problem, the server may return a portion of the payment that the user had made in step 210.

If the content of the user feedback provides a new solution for the problem description, the user may be rewarded for contributing the new solution after an extra evaluating process for the new solution. If the user did not provide more than the rating information or if the alternative solution in the user feedback already exists in the knowledgebase, the payment made by the user is taken by the server. If the new solution was evaluated as contributing to the solution that already exists in the knowledgebase, the payment may be returned in part as a reward for the contribution made by the user.

In another embodiment, the server may operate without any payment or at a reduced cost if the knowledgebase is not fully established to encourage extensive usage and submission of solutions by users.

Figure 3:
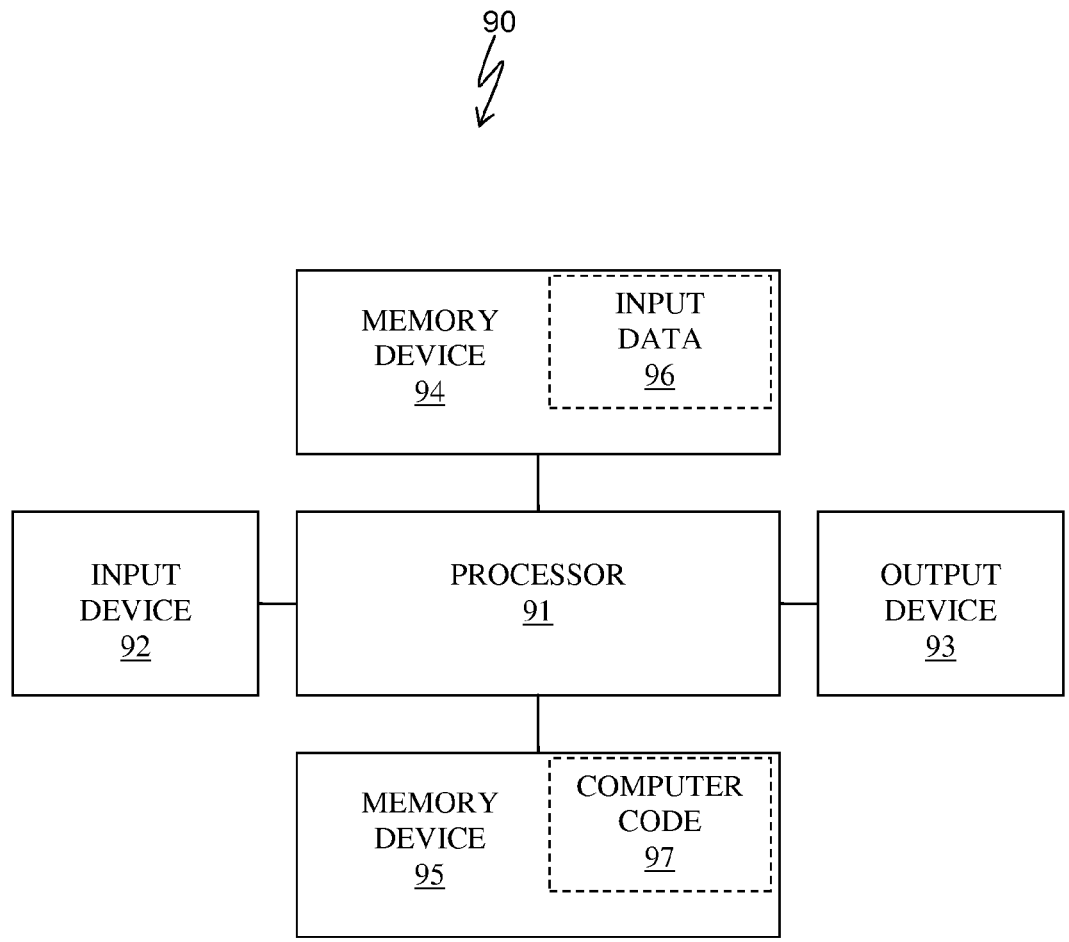
FIG. 3 illustrates a computer system used for building a knowledgebase of solutions for problems in a software system, in accordance with embodiments of the present invention.

FIG. 3 illustrates a computer system 90 used for building a knowledgebase of solutions for problems in a software system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for building a knowledgebase of solutions for problems in a software system according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for building a knowledgebase for a software system, the method comprising:
receiving a request comprising a problem description and payment information from a user, the request received by a computer system that is coupled to a knowledgebase, the knowledgebase having a set of problem-solution tuples, wherein each problem-solution tuple comprises a problem description and at least one associated solution to the problem description;
verifying the payment information received in the request from the user;

searching the knowledgebase by a processor, for at least one problem-solution tuple having a problem description that matches the problem description in the request from the user;

sending at least one solution located in the search of the knowledgebase to the user;

receiving feedback from the user, wherein the feedback comprises rate information indicating how the user values at least one solution sent to the user;

evaluating the received feedback;

calculating, by the processor, a reward based on the feedback provided by the user, for an author of at least one solution sent to the user; and paying the calculated reward to the author.

2. The method of claim 1, wherein searching the knowledgebase by a processor, for at least one problem-solution tuple comprises searching the respective problem descriptions of the tuples in the knowledgebase, and wherein for a given tuple, each solution describes how to solve or prevent a software problem specified in the respective problem description.

3. The method of claim 1, wherein:

evaluating the received feedback comprises:
receiving rate information that is negative indicating that the user is dissatisfied with a solution sent to the user, wherein responsive to receiving the the rate information that is negative, prompting the user to provide evidence supporting the negative rate information; and examining, upon receiving evidence from the user, the solution that received negative rate information, the feedback provided by the user, and the evidence by acquiring a review of the solution from a group authors who previously had at least one solution registered in the knowledgebase; and calculating the reward is further based upon the evaluation of the received feedback.

4. The method of claim 1, wherein:

evaluating the received feedback comprises:
receiving rate information that is negative indicating that the user is dissatisfied with a solution sent to the user, wherein responsive to receiving the rate information that is negative, prompting the user to provide a new solution to the problem description; and determining that the new solution provided by the user is not a duplicate of any other solution already registered in the knowledgebase; and registering the new solution as an alternative solution for the problem description in the knowledgebase if the new solution is not a duplicate.

5. The method of claim 1, wherein:

evaluating the received feedback comprises:
receiving rate information that is negative indicating that the user is dissatisfied with a solution sent to the user, wherein responsive to receiving the rate information that is negative, prompting the user to provide a new solution to the problem description;

determining that the new solution provided by the user is not a duplicate of any other solution already registered in the knowledgebase; and examining the new solution by acquiring a review from a group of authors who previously had at least one solution registered in the knowledgebase; and calculating the reward is further based upon the evaluation of the received feedback.

6. The method of claim 1, the method further comprising:
adding the evaluated feedback as an appendix to the tuple in the knowledgebase having the solution associated with the feedback, responsive to determining that a solution provided by the user in the evaluated feedback does not exist in the knowledgebase.

7. The method of claim 1, further comprising:
inserting a solution provided by the user in the evaluated feedback into the tuple in the knowledgebase having the solution associated with the feedback, responsive to an affirmative review for the feedback provided by a group of authors who previously had at least one solution registered in the knowledgebase.

8. A computer program product, comprising a computer usable storage medium having a computer readable program code embodied therein, said computer readable program code containing instructions that when executed by a processor of a computer system build a knowledgebase for a software system comprising:

receiving a request comprising a problem description and payment information from a user, the request received by a computer system that is coupled to a knowledgebase, the knowledgebase having a set of problem-solution tuples, wherein each problem-solution tuple comprises a problem description and at least one associated solution to the problem description;

verifying the payment information received in the request from the user;

searching the knowledgebase by a processor, for at least one problem-solution tuple having a problem description that matches the problem description in the request from the user;

sending at least one solution located in the search of the knowledgebase to the user;

receiving feedback from the user, wherein the feedback comprises rate information indicating how the user values at least one solution sent to the user;

evaluating the received feedback;

calculating, by the processor, a reward based on the feedback provided by the user, for an author of at least one solution sent to the user; and paying the calculated reward to the author.

9. The computer program product of claim 8, wherein the instructions for:

searching the knowledgebase by a processor, for at least one problem-solution tuple comprises searching the respective problem descriptions of the tuples in the knowledgebase, and wherein for a given tuple, each solution describes how to solve or prevent a software problem specified in the respective problem description.

10. The computer program product of claim 8, wherein the instructions for:

evaluating the received feedback comprises:
receiving rate information that is negative indicating that the user is dissatisfied with a solution sent to the user, wherein responsive to receiving the rate information that is negative, prompting the user to provide evidence supporting the negative rate information; and examining, upon receiving evidence from the user, the solution that received negative rate information, the feedback provided by the user, and the evidence by acquiring a review of the solution from a group authors who previously had at least one solution registered in the knowledgebase; and calculating the reward is further based upon the evaluation of the received feedback.

11. The computer program product of claim 8, wherein the instructions for:
  evaluating the received feedback comprises:
    receiving rate information that is negative indicating that the user is dissatisfied with a solution sent to the user, wherein responsive to receiving the rate information that is negative,
    prompting the user to provide a new solution to the problem description; and
    determining that the new solution provided by the user is not a duplicate of any other solution already registered in the knowledgebase; and
  registering the new solution as an alternative solution for the problem description in the knowledgebase if the new solution is not a duplicate.

12. The computer program product of claim 8, wherein the instructions for:
  evaluating the received feedback comprises:
    receiving rate information that is negative indicating that the user is dissatisfied with a solution sent to the user, wherein responsive to receiving the rate information that is negative,
    prompting the user to provide a new solution to the problem description;
    determining that the new solution provided by the user is not a duplicate of any other solution already registered in the knowledgebase; and
    examining the new solution by acquiring a review from a group of authors who previously had at least one solution registered in the knowledgebase; and
  calculating the reward is further based upon the evaluation of the received feedback.

13. The computer program product of claim 8, further comprising instructions for:
  adding the evaluated feedback as an appendix to the tuple in the knowledgebase having the solution associated with the feedback, responsive to determining that a solution provided by the user in the evaluated feedback does not exist in the knowledgebase.

14. The computer program product of claim 8, further comprising instructions for:
  inserting a solution provided by the user in the evaluated feedback into the tuple in the knowledgebase having the solution associated with the feedback, responsive to an affirmative review for the feedback provided by a group of authors who previously had at least one solution registered in the knowledgebase.

15. A computer system comprising a processor and a computer readable memory unit coupled to the processor, said memory unit containing instructions that when executed by the processor build a knowledgebase for a software system, comprising:
  receiving a request comprising a problem description and payment information from a user, the request received by a computer system that is coupled to a knowledgebase, the knowledgebase having a set of problem-solution tuples, wherein each problem-solution tuple comprises a problem description and at least one associated solution to the problem description;
  verifying the payment information received in the request from the user;
  searching the knowledgebase by a processor, for at least one problem-solution tuple having a problem description that matches the problem description in the request from the user;
  sending at least one solution located in the search of the knowledgebase to the user;
  receiving feedback from the user, wherein the feedback comprises rate information indicating how the user values at least one solution sent to the user;
  evaluating the received feedback;
  calculating, by the processor, a reward based on the feedback provided by the user, for an author of at least one solution sent to the user; and
  paying the calculated reward to the author.

16. The computer system of claim 15, wherein said evaluating comprises:
  responsive to receiving the feedback comprising the rate information that is negative, which indicates that the user is dissatisfied with a solution sent to the user, prompting the user to provide evidence supporting the negative rate information; and
  upon receiving evidence, examining the solution, the feedback, and evidence by acquiring a review from a group of authors who previously had at least one solution registered in the knowledgebase.

17. The computer system of claim 15, wherein said evaluating comprises:
  responsive to receiving the feedback comprising the rate information that is negative, which indicates that the user is dissatisfied with a solution of at least one solution sent to the user, prompting the user to provide a new solution for the problem description;
  upon receiving the new solution, determining that the new solution provided by the user is not a duplicate of any other record already registered in the knowledgebase and registering the new solution as an alternative solution for the problem description in the knowledgebase if the new solution is not a duplicate.

18. The computer system of claim 15, wherein said evaluating comprises:
  responsive to receiving the feedback comprising the rate information that is negative, which indicates that the user is dissatisfied with a solution sent to the user, prompting the user to provide a new solution for the problem description;
  upon receiving the new solution, determining that the new solution provided by the user is not a duplicate of any other solution already registered in the knowledgebase;
  examining the new solution by acquiring a review from a group of authors who previously had at least one solution registered in the knowledgebase; and
  registering the new solution as an alternative solution for the problem description in the knowledgebase if the new solution is not a duplicate.

19. The computer system of claim 15, further comprising:
  adding the evaluated feedback as an appendix to the tuple in the knowledgebase having the solution associated with the feedback, responsive to determining that a solution provided by the user in the evaluated feedback does not exist in the knowledgebase.

20. The computer system of claim 15, further comprising:
  inserting a solution provided by the user in the evaluated feedback into the tuple in the knowledgebase having the solution associated with the feedback, responsive to an affirmative review for the feedback provided by a group of authors who previously had at least one solution registered in the knowledgebase.

* * * * *